Patented Sept. 30, 1947

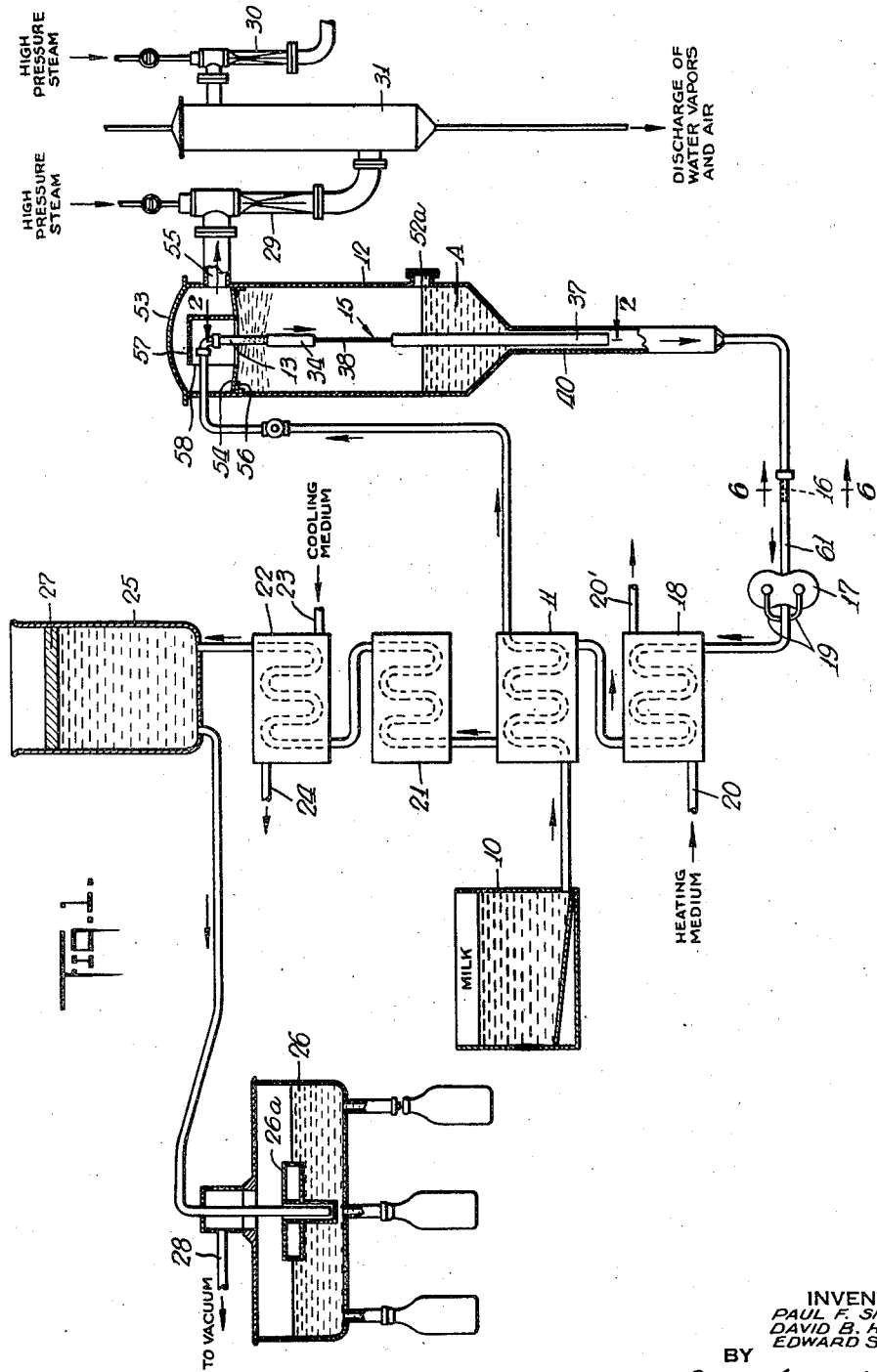

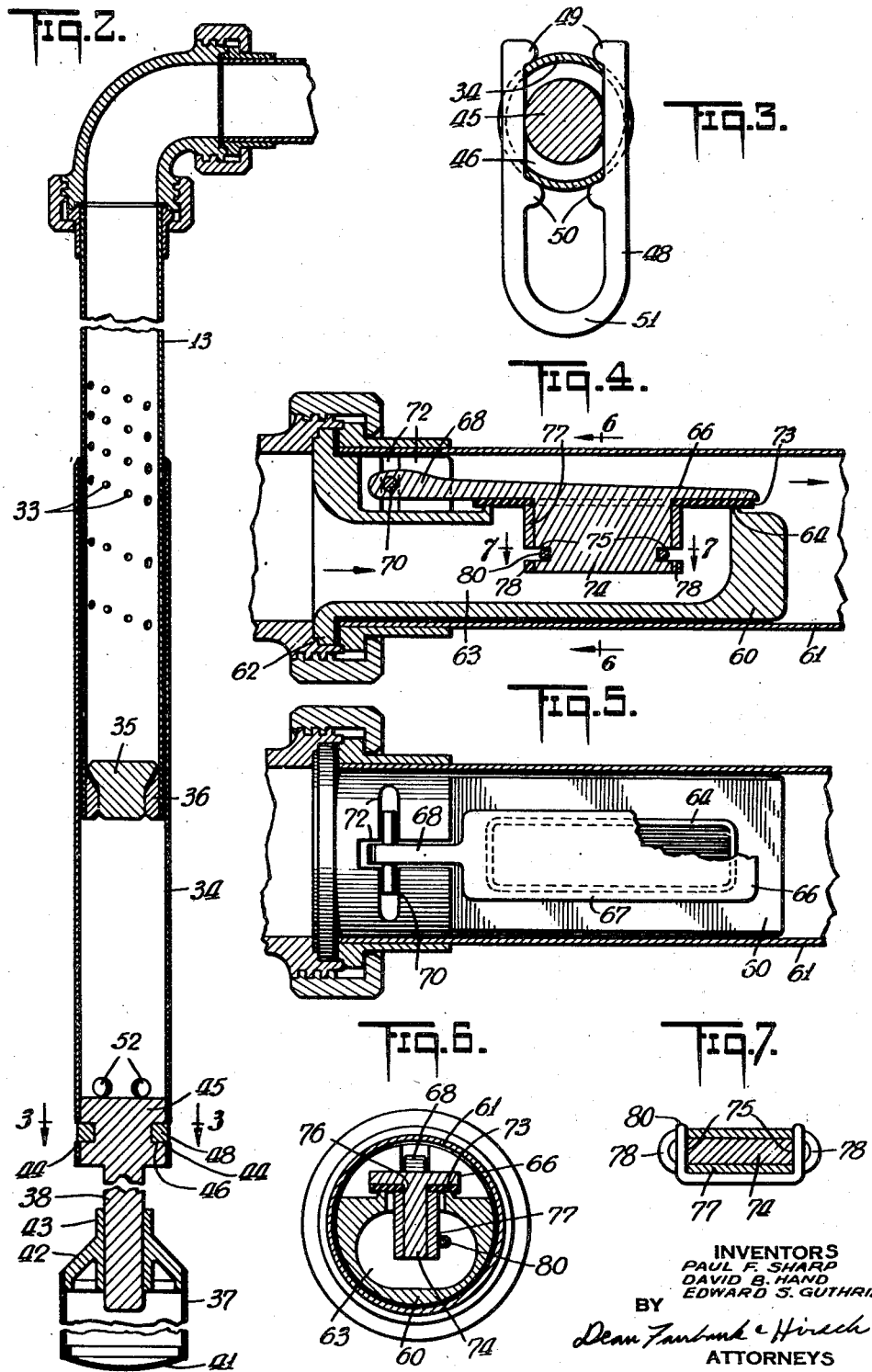

2,428,044

UNITED STATES PATENT OFFICE 2,428,044

METHOD AND APPARATUS FOR DEAERATING LIQUID FOODS

Paul F. Sharp, David B. Hand, and Edward S. Guthrie, Ithaca, N. Y., assignors to Cornell Research Foundation, Inc., Ithaca, N. Y., a corporation of New York Application April 9, 1942, Serial No. 438,216

13 Claims. (Cl. 99—61)

This application is a continuation in part of our prior and copending application Serial No. 233,714, filed October 7, 1938, which has now become abandoned.

The present invention relates to the processing of liquid food materials such as milk, fruit juices, tomato juice and the like, and has for one of its important objects the provision of an improved, highly efficient, economical and sanitary apparatus and method for continuously handling and processing liquid food materials in a closed system from their raw state to their final enclosure in containers for shipment or storage, whereby the nutritive qualities of the raw materials, and the sterility and other advantageous qualities imparted to the materials during the processing thereof, are preserved in the final product to a higher degree and for considerably longer periods of time than has been possible with apparatus and methods heretofore employed for the purpose.

Certain liquid foods such as raw milk contain appreciable quantities of ascorbic acid known as vitamin C, which is easily destroyed through the effects of dissolved oxygen in the milk. This oxygen is also responsible for the development of the off or oxidized flavor in the milk. This deterioration of the milk is accelerated by the copper dissolved from the milk plant equipment, by the action of sunlight and by irradiation in cases where the milk is treated to the action of artificial ultra-violet rays. Deaeration of the milk preserves its vitamin C, and prevents development of the oxidized flavor in spite of copper contamination or the action of ultra-violet rays.

Hence another object is to provide a new and improved method and apparatus for deaerating liquid food to preserve its nutritive qualities and prevent development of the oxidized flavor.

Various other objects, features and advantages of the invention will be apparent from the following particular description, and from an inspection of the accompanying drawings, in which Fig. 1 is a side elevation somewhat schematic and partly in section of a form of apparatus which may be employed for carrying out the method of the present invention, and which constitutes one embodiment of this invention;

Fig. 2 is a vertical section of a float control valve employed in controlling the flow of liquid food into the deaerator;

Fig. 3 is a section taken on line 3—3 of Fig. 2;

Fig. 4 is a vertical section of a form of check valve which is mounted at the outlet of the deaerator and which forms an embodiment of the present invention.

Fig. 5 is a plan view partly in section of the construction shown in Fig. 4;

Fig. 6 is a section taken on line 6—6 of Figs. 1 and 4; and

Fig. 7 is a section taken on line 7—7 of Fig. 4.

In carrying out the method of the present invention as applied to the treatment of milk, the loss of ascorbic acid and the development of oxidized flavor in the milk are prevented by subjecting the milk in a deaerator to a vacuum high enough to boil the water therein at the prevailing temperature at which this milk enters the deaerator. This milk is sprayed into the deaerator so that its water is instantaneously flash boiled as the milk is introduced into the deaerator. This flash boiling of the water contents of the milk completely sweeps or washes out the air from the milk, so that the milk collected at the bottom of the deaerator is substantially free of oxygen. This oxygen-free milk is kept out of contact with the air while it is being further processed or delivered to a bottling station.

Referring to Fig. 1 of the drawings as an example of an apparatus which can be employed to continuously carry out the method of the present invention, the milk to be treated is placed in a reservoir tank 10 and drawn therefrom through a preheater 11 to a deaerator chamber 12 by the vacuum in said chamber. The milk is introduced into the top of the deaerator chamber 12 through a cylindrical intake pipe 13 at a rate controlled by a float valve 15. This intake pipe 13 is formed with a series of circumferentially arranged holes, so that the milk is sprayed from said pipe laterally in all directions against the sides of the deaerator chamber 12, runs down along the sides of said chamber, and is collected at the bottom. Due to the finely divided state of the milk in the spray, and the thin film of milk on the walls of the deaerator chamber 12, there is secured very efficient and rapid flash boiling resulting in rapid and complete removal of the air from the milk.

The deaerated milk A is drawn off from the deaerator chamber 12 through a check valve 16 by means of a constant speed pump 17, which pump forces the milk through a pasteurizer 18 having an inlet 20 and an outlet 20' for the heating medium, and which maintains the milk beyond the pump under sufficient super-atmospheric pressure to prevent air leakage into the system and reaeration of the milk.

The milk is heated in the pasteurizer 18 and is then passed through a holder 21 at a rate so that the time of passage requires 15+ seconds before it enters the cooler, the milk being maintained at a temperature of 160° F.+1 or 2 degrees.

This is the so-called high temperature short time pasteurization. In order to control the pasteurization, the rate of flow must be adjusted and that is one of the important features of a constant speed pump in removing the milk from the deaerator.

In some cases the deaerator could be placed 32 feet up in the air so that the milk could flow from the bottom of the deaerator without the need of a pump.

Although not shown in the diagrammatic illustration of the drawings, it will be understood of course that in commercial milk plants there necessarily are a large number of fitting joints, and it has been found practically impossible to keep all of such joints completely air-tight. For this reason, in installations where deaeration of the milk is accomplished, as for example by the method of the present invention, it is desirable for the milk to be placed under positive pressure as soon as possible after leaving the deaerator so as to minimize the possibility of air leakage inwardly through the fitting joints. The pump 17 should therefore be placed as close as possible to the deaerator 12, and is designed so that some milk from the high pressure side is lead back through connections 19 to the pump bearings to seal the latter. With this construction, any leakage past the pump bearings will be limited to that of the milk, so that air leakage through these bearings is prevented.

To conserve heat, the heated milk from the pasteurizer 18 is passed through the preheater 11 in heat exchange relationship with the milk passing through said preheater on its way to the deaerator chamber 12 although this feature is not essential to the present invention. From this preheater 11 the deaerated milk goes through a cooler 22 having an inlet 23 and an outlet 24 for the cooling medium, and then passes to a surge tank 25. The milk is delivered from this surge tank 25 to the reservoir 26 of a bottle-filling apparatus, at a rate controlled by the level of the milk in said reservoir. A suitable float valve 26a at the inlet of the reservoir 26 is provided for this control.

In order to prevent reaeration of the milk in the surge tank 25, the surface of the milk is covered by a float 27 having a comparatively small clearance, as for instance, about ⅛" to ¼" between its periphery and the walls of the tank 25. The introduction of milk into the surge tank 25 and the removal of milk therefrom is accomplished below the level of the float 27.

Although a surge tank 25 with a float 27 as described has been found advantageous to maintain the milk under pressure from said tank to the filling reservoir 26, and to prevent reaeration of the milk, other means may be employed for this purpose. For instance, instead of the float 27, a piston may be employed backed up by a hydraulic pressure system to maintain the milk in the surge tank 25 and beyond said tank under super-atmospheric pressure. The pump 17 could be operated at constant speed, the surge tank hydraulic pressure system within practical limits of operation taking care of any differential between the rate of drawing milk from the deaerator 12 and the rate of delivering milk from the filling reservoir 26 to the bottles.

As another modification, the hydraulic piston in the surge tank 25 could be connected to control the operation of the pump 17, stopping said pump when the pressure in said tank exceeds a predetermined amount. With this construction when the pump 17 is stopped, the level of the milk in the deaerator 12 would build up so that the float valve 15 would shut off the supply to said deaerator. Obviously this modification would not be used where pasteurization by the continuous process is employed as stopping the pump would overheat the milk in the heater and holder pipe.

As a further modification, the surge tank 25 could be eliminated entirely and a pressure-responsive device provided for starting and stopping the pump 17 or varying its speed in a manner to compensate for fluctuations in the rate of delivery of the milk from the filling reservoir 26 to the bottles.

In any case, it is highly desirable that the milk or other liquid food being processed be maintained under super-atmospheric pressure throughout the piping system from pump 17 to surge tank 25 and from the surge tank to the inlet valve of the bottle-filling reservoir 26, and that the milk or other liquid food in surge tank 25 be maintained under super-atmospheric pressure or be protected from contact with air by some means such as the float 27.

The bottles are filled without reaeration of the milk. This can be accomplished by maintaining the reservoir 26 of the bottle-filling apparatus under vacuum by suitable means, such as a vacuum connection 28, so that milk will be drawn by this vacuum from the surge tank 25 into said reservoir when the float in the reservoir is below a predetermined level, and by employing a suitable vacuum type filling valve capable of evacuating the bottles before they are filled.

The necessary degree of vacuum in the deaerator chamber 12 may be produced by any suitable means. In the specific form shown, there are provided two steam jet evacuators 29 and 30 connected in series with an intermediate condenser 31.

Although in the method illustrated the pasteurization of the milk takes place after the deaeration process, as far as certain aspects of the invention are concerned, the milk may be pasteurized before the deaerating process. In any case, it is desirable that the milk being treated be as fresh as conditions of collection and transportation will permit, so that its vitamin C content at the time of treatment may be as high as possible. In cases where a considerable loss of ascorbic acid has taken place, due for instance to the aging of the milk prior to the deaerating treatment, the milk may be fortified by the introduction of additional ascorbic acid prior or during the deaerating process.

The vacuum in the deaerator chamber 12 should be sufficient to produce flash boiling of the water in the milk at the prevailing temperature at which it enters this chamber, and this boiling should be sufficient to cause the vaporization and removal of an amount of water equal to from ½% to 2% of the weight of the milk. To accomplish this, the vacuum in the deaerator chamber 12 and the extent of flash boiling of the milk should be such that the temperature of the milk drops about 7° to 15° F. An absolute pressure of about 1.7 to 2.2 inches of mercury in the deaerator chamber 12 has been found sufficient for this purpose if the temperature of the milk is 110° F. Temperature drop, pressure and milk temperature are obviously interrelated.

To prevent churning, loss of gravity creaming ability and excessive foaming of the milk, it is important that the milk in the deaerator chamber 12 does not drop below the solidifying temperature of the fat, which is about 90° F. The milk, therefore, should be preheated to a temperature above 90° F. plus the temperature drop of 7° to 15° F. resulting from the flash boiling, so that the milk would be introduced into the deaerator chamber 12 at a temperature of about 105° to 115° F.

The spray intake pipe 13 in the deaerator chamber 12 is provided with a series of spray holes 33 (Figs. 1, 2 and 3) shown helically arranged on said pipe and flared outwardly to increase the spray action, and to render these holes visible and readily accessible for easy cleaning and brushing. The flow control through these holes 33 which may be about $\frac{1}{16}$ inch in diameter at their narrowest inner ends is by means of a float controlled sleeve 34 slidable over the intake pipe 13, and serving as a throttling device to block off or expose these holes successively according to the vertical position of said sleeve. It is desirable to effect control over only a comparatively few spray holes 33, while leaving the bulk of the spray holes always open during normal deaerating operations. For that purpose, the holes 33 are desirably arranged so that more of them are provided per unit of length in the upper perforated section of the intake pipe 13 than in its controlled lower section. In the specific form shown, the upper perforated section of the intake pipe 13 is provided with a double helical row of spray holes 33, while the lower controlled section has a single row. Although the float sleeve 34 is shown in Fig. 2 controlling the upper perforated section of the intake spray pipe 13, it is desirable that during normal operations the upper edge of said sleeve be opposite the lower perforated section of said pipe where the single row of holes 33 is arranged.

The bottom of the intake spray pipe 13 is closed in a manner to permit it to be easily cleared for cleaning purposes. For that purpose, a plug 35 is dropped onto an annular seat 36 secured by welding in the inside of the pipe 13, and is retained on said seat merely by the action of gravity. The fluid pressure in the spray pipe 13 acting downwardly on the plug 35 will cause said plug to be retained in seated position during operations.

The sleeve 34 telescoped over the spray intake pipe 13 is desirably chamfered or bevelled at its upper end to form a comparatively sharp rim edge by which the holes 33 may be successively blocked and the flow therethrough throttled as the level of the milk A in the deaerator chamber 12 rises. This sleeve 34 has a slight clearance with respect to the spray pipe 13 to afford a free slide fit with said pipe. This clearance depends on the accuracy with which the parts are made and the extent of their resistance to denting during cleaning and handling. In actual practice, a clearance equivalent to a difference of $\frac{1}{32}$ of an inch between the internal diameter of the sleeve 34 and external diameter of the spray pipe 13 has been found sufficient.

The vertical position of the sleeve 34 is controlled from the level of the milk A by a float or bob 37 supporting said sleeve through a connecting rod 38. Proper control of this milk level is important. If this level is too low, air bubbles or foam will pass out with the milk removed from the deaerator chamber 12, and if it is too high, the tendency towards churning is increased.

Another problem in connection with a float control valve in the deaerator is the erratic fluctuating effect on the float of changes in density of the layer of milk at the surface due to foaming. This erratic fluctuation of the float will cause the milk to be introduced into the deaerator in intermittent spurts.

By providing a long narrow float 37, a considerable portion of this float will be immersed in the liquid, so that the fluctuating influence of the foam at the surface tending to cause erratic movements of the float will be reduced materially, and the float will be substantially stabilized to permit a uniform steady flow of milk into the deaerator chamber 12. A float of about 49 inches long and about 1½ inches in diameter, and having a buoyancy which will cause over three-quarters of its length to be immersed has been found satisfactory for the purpose.

The lower end of the deaerator chamber 12 is formed with a deep depending cylindrical extension or well 40 of reduced width serving not only to accommodate the lower immersed section of the elongated float 37, but also serving by its reduced width as a guide to limit lateral swaying of said float. The depending extension or well 40 has the further important advantage that it insures ample time for all air bubbles and foam to escape from the body of milk A before the milk is drawn off from the bottom of the deaerator.

The float 37 is desirably made of a thin gauge stainless steel tube, having its lower end hermetically sealed by a head 41 welded thereto, and having its upper end closed by a plug 42 hermetically welded to said tube and formed with a collar 43 snugly embracing the lower section of the connecting rod 38. This rod 38 may be attached to this collar 43 by soldering, and the extent to which it projects into the interior of the float tube depends on the desired weight of the float and the desired distance between the float and the control sleeve 34.

The upper end of the rod 38 is secured to the sleeve 34 by a sanitary connection which permits easy separation of its parts for cleaning and brushing. For that purpose, the lower end of the sleeve 34 is formed with two slots 44 on diametrically opposed sides thereof, and the upper end of the rod 38 is formed with a cylindrical head 45 which fits snugly into the lower end of said sleeve 34, and which is formed with an annular recess 46 in registry with said slots 44. This rod head 38 is detachably retained in position in the sleeve 34 by a spring clip 48 extending into the slots 44 and the recess 46. This spring clip 48 is U-shaped, and is formed with a pair of opposed inward end projections 49 and a pair of opposed inward projections 50 spaced from the ends of the clip. The distance between the inner faces of the two arms of the clip between the two pairs of projections 49 and 50 is substantially equal to the diameter of the head 45 at the recess portion thereof, so that these clip arms prevent axial displacement of the sleeve 34 with respect to the rod 38. The two pairs of projections 49 and 50 serve as stop means to yieldably resist the removal of the spring clip 48. The end projections 49 are rounded to cam the clip arms apart as the clip 48 is forced in or out of fastening position. The bent section of the spring clip 48 projects beyond the sleeve 34, and forms a finger loop 51 by which said clip may be manipulated into or out of sleeve fastening position.

Near the bottom of the sleeve 34 is a series of holes 52 which permit escape of any milk therethrough that might leak past the plug 35, so that no pressure is allowed to build up in said sleeve sufficient to exert a downward pressure on said sleeve.

The float control construction described has many desirable features which make it highly suitable for the purpose. It is simple and inexpensive to manufacture; it is operated by gravity, thereby making it more reliable than if it were operated by electricity, air pressure or other devices which are apt to fail in an emergency; it does not involve the cutting of a hole in the deaerator shell as in the case of other types of control, thereby eliminating a source of leakage and reducing the cost of manufacture; the float is not subject to the downward pressure of the milk entering the intake spray pipe 13, since the fluid pressure from said pipe acting on the sleeve 34 is all horizontal and in an outward direction; the sleeve 34 is centered with respect to the intake spray pipe 13 by the horizontal outward pressure in all directions acting on said sleeve, thereby preventing binding of said sleeve and unequal slide wear of said pipe and said sleeve; it floats freely in the milk; it is self-lubricated by the milk; it acts to throttle the flow and does not act as an on and off valve, thereby permitting fine continuous adjustment of the flow of the milk; due to the deep immersion of the float it avoids almost completely the effect of the rapid fluctuations in density and displacement at the surface of the milk to which a round or flat shallow float would be subjected; and it can be easily taken apart for cleaning, since all the parts are visible for inspection and accessible for operation, and are free from threads.

Near the lower section of the deaerator chamber 12 is a window 52a (Fig. 1) for observation of the milk level. At its upper end, the deaerator chamber 12 is provided with a detachable cover 53 seated on the upper edge of the deaerator shell, and desirably provided with an annular flange extending outwardly from said shell to permit the easy removal of said cover for cleaning purposes.

In order to prevent passage of the fine particles of milk out with the air to the evacuator 29, 30 and 31, there is provided a horizontal baffle 54 located in the deaerator chamber 12 above the spray apertured section of the intake pipe 13 and below the connection 55 to the evacuator. This baffle 54 is seated on lugs or flanges 56 extending inwardly from the deaerator shell, so that said baffle can be easily removed for cleaning, and is in the form of a disc slightly dished to prevent the collection of liquid thereon. A central opening in the baffle 54 receives the intake spray pipe 13 and forms a drain for said baffle 54. A supplemental baffle 57 around the intake spray pipe 13 is seated on the baffle 54 over its central opening, and forms a housing with an open bottom, and an open side 58 directed away from the outlet 55 leading to the evacuator 29, 30 and 31. The details of construction of the deaerator above described are not claimed herein but are claimed in applicants' divisional application Serial No. 439,836, filed April 21, 1942.

The check valve 16 insures against any leakage of air back into the deaerator chamber 12 through the piping system, and also prevents the pump from losing its prime. This valve is small and compact enough so that it can be inserted in an ordinary horizontal milk pipe line, and is designed to meet the sanitary requirements of the dairy industry. For that purpose, the valve includes a valve seat member 60 (Figs. 4–7) shown in the form of a block removably extending in an ordinary milk pipe line 61, and formed with a flange 62 at one end abutting the end of this pipe line. A recess 63 shown of substantially elliptical cross-section in the seat member 60 forms an inlet passage for the milk in its flow towards the pipe line 61. This seat member 60 has a raised rim seat 64 shown in the shape of a substantially oblong rectangle extending lengthwise of the pipe line 61. Seated on this rim seat 64 is a flap valve comprising a tongue 66 having a substantially oblong rectangular section 67 and a shank 68. Extending transversely through this shank 68 is a pin 70 forming a crosshead. For loosely receiving this cross-head, the seat member 60 is formed beyond one end of the rim seat 64 with a cross-shaped recess 72 open at its upper end to permit the tongue cross-head 68, 70 to be slipped into or out of said recess. The bottom of this cross-recess 72 extends below the rim seat 64, so that the valve flap can move vertically as well as angularly.

The flap valve is weighted to assure proper seating of the valve, and is provided with a gasket 73 of resilient material, such as rubber, to assure an absolute tight closure fit. To detachably retain this gasket 73 in position, and to weight the flap valve, the valve tongue 66 has a depending flange 74 of substantially oblong cross-section formed with a pair of notches 75 at the ends thereof. The gasket 73 is formed with an oblong aperture 76 snugly receiving the flange 74. A metal weight band 77 is snugly telescoped over the flange 74, and is formed with a pair of slots 78 at the ends thereof registering with the flange notches 75. This weight band 77 is detachably retained on the flange 74 and against the rubber gasket 73 by means of a U-shaped spring clip 80 inserted through the registering notches 75 and slots 78.

One feature of the check valve shown is that it can be installed in an ordinary horizontal milk pipe. A check valve that is installed in a vertical pipe requires the use of an inverted U-pipe in the horizontal pipe line, and also requires a comparatively large number of unions which are susceptible to leakage. With the construction as shown, the nut which ordinarily joins two pipes together is sufficiently long to make the connection of the check valve in position, so that no additional nut or ferrule is required.

The valve flap moves up and down vertically, although this movement may deviate slightly from the vertical positioning due to its loose hinged connection, so that the proper gravitational seating of the flap valve on the seat 64 is effected and an absolute closure tight fit assured. Furthermore, this check valve is free from threaded parts and inaccessible holes or recesses, and can be easily disassembled for cleaning and inspection, so that it meets all the sanitary requirements of the dairy industry. The details of construction of the check valve above described are not claimed herein but are claimed in the patent of Paul F. Sharp, No. 2,355,683, issued August 15, 1944.

As many changes can be made in the above method and apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A once-through process for treating milk to preserve its vitamin C content, to remove dissolved oxygen, and to retard the development of an off-flavor therein, comprising continuously delivering the milk into a deaerating chamber as a finely divided spray and at a temperature of about 105° to 115° F., maintaining sufficient vacuum in said chamber to evaporate an amount of water equal to about ½% to 2% of the weight of the milk and reduce the temperature about 7° to 15° F., continuously removing said oxygen and water vapor from said chamber as rapidly as liberated, and continuously removing the deoxygenated milk from said chamber at a point substantially below the liquid surface level therein and at substantially the rate at which it is being sprayed to maintain a substantially constant liquid level of milk in said chamber under said vacuum.

2. The process for treating milk to preserve its vitamin C content, remove dissolved oxygen, and retard the development of an off-flavor therein, comprising delivering the milk as a finely divided spray into a chamber maintained under a vacuum high enough to evaporate sufficient water from the sprayed milk to remove substantially all of the dissolved oxygen and to reduce the temperature of the milk about 7° to 15° F. by the removal of latent heat of evaporation of the water, maintaining a substantially constant volume of the milk in said chamber at a constant level and under said vacuum, and continuously withdrawing the deoxygenated milk from said chamber at a point substantially below the liquid surface level therein.

3. A once-through process of treating milk to retard the destruction of ascorbic acid and the development of oxidized flavor therein, comprising flash boiling water from a spray of the milk continuously delivered at a temperature of about 105° F. to 115° F., to a deaerating chamber maintained under subatmospheric pressure below the boiling point of the water at the prevailing temperature of the milk, and sufficiently low to remove substantially all of the oxygen dissolved in the milk, removing said oxygen and water vapor from said chamber as liberated from the milk, maintaining a body of milk in said chamber under said vacuum, and continuously withdrawing the deaerated milk from said chamber at a point substantially below the liquid surface level therein.

4. The process of treating milk to retard the destruction of ascorbic acid and the development of oxidized flavors therein, comprising continuously spraying the milk into a deaerating chamber continuously maintained under a vacuum high enough to remove substantially all of the dissolved oxygen and sufficient water from the milk to reduce the weight of the milk substantially ½% to 2%, removing said oxygen and water vapor from said chamber, as liberated from the milk, maintaining a body of milk in said chamber under said vacuum, and continuously withdrawing the deaerated milk from said chamber at a point substantially below the liquid surface level therein.

5. A continuous process for treating a liquid food product containing ascorbic acid to retard the destruction of said ascorbic acid and the development of oxidized flavors in said liquid product, which comprises continuously delivering the liquid in a relatively finely divided spray into the upper part of a deaerating chamber, simultaneously withdrawing deaerated liquid from the lower part of said chamber at a point substantially below the surface level of a body of liquid collected in the bottom of the chamber in order to prevent the withdrawal of air and foam from the chamber, controlling the relative rates of delivery and withdrawal of the liquid to maintain said liquid surface level within a predetermined relatively close range, maintaining said chamber under a vacuum high enough to effect flash vaporization of a part of the water content of said liquid at the temperature at which the liquid is delivered into said chamber and to effect rapid and substantially complete removal of all air from the liquid in the chamber, and withdrawing water vapor and air from said chamber as rapidly as they are liberated from said liquid.

6. A continuous process for treating a liquid food product containing ascorbic acid to retard the destruction of said ascorbic acid and the development of oxidized flavors in said liquid product while preventing reaeration thereof, which comprises continuously delivering the liquid in a relatively finely divided spray into the upper part of a deaerating chamber, simultaneously withdrawing deaerated liquid from the lower part of said chamber, controlling the relative rates of delivery and withdrawal of the liquid so as to maintain a body of liquid of predetermined substantially constant depth in the chamber, maintaining the chamber under a vacuum high enough to effect flash vaporization of a predetermined portion of the water content of the liquid at the temperature at which the liquid is delivered into the chamber and to effect rapid and substantially complete removal of all air from the liquid in the chamber, withdrawing water vapor and air from the chamber above the surface level of said body of liquid as fast as the water vapor and air are liberated from the liquid, the said withdrawal of deaerated liquid from said chamber being effected at a point substantially below said liquid surface level, conducting the withdrawn deaerated liquid through a closed conduit system to a container filling mechanism, and subjecting the liquid to elevated pressure in said conduit system to prevent entrance of air thereinto and resultant recontamination of the deaerated liquid.

7. An apparatus for deaerating a liquid food and preventing contact thereof with air during packaging and including a supply reservoir for said liquid, a deaerator chamber, means for continuously delivering liquid from said reservoir to the upper part of said chamber, and including an intake pipe, means for preheating said liquid prior to its delivery into said chamber, means for continuously maintaining said chamber at a vacuum high enough to effect boiling of the water in said liquid at the prevailing temperature said liquid is introduced into said chamber to remove substantially all of the oxygen from said liquid, a container-filling mechanism, a pump connected to the liquid outlet side of said chamber for continuously drawing the liquid from the bottom of said chamber and delivering it towards said filling mechanism, means including said pump for maintaining said liquid beyond said pump and up to the inlet of said filling mechanism under super-atmospheric pressure to prevent reaeration of said liquid, and means for controlling the flow of liquid through said intake pipe in accordance with the level of the liquid in the bottom of said chamber to maintain said level sufficiently high to prevent drawing off of air and foam from said chamber.

8. An apparatus for deaerating a liquid food and preventing contact of air therewith during packaging, said apparatus including a supply reservoir for said liquid, a deaerator chamber, means for continuously delivering liquid from said reservoir to the upper part of said chamber, and including an intake spray pipe, means for preheating said liquid prior to its delivery into said chamber, means for continuously maintaining said chamber at a vacuum high enough to effect boiling of the water in said liquid at the temperature at which said liquid is introduced into said chamber to remove substantially all of the oxygen from said liquid, a surge tank, means for maintaining said surge tank under super-atmospheric pressure in the absence of air, a container-filling mechanism including a filling reservoir, a pump connected to the outlet side of said chamber and disposed relatively close to said chamber for continuously drawing the liquid from the bottom of said chamber and delivering it to said surge tank under super-atmospheric pressure, means for delivering liquid from said surge tank to said filling reservoir to prevent reaeration of said liquid, and means for controlling the flow of liquid through said intake pipe into said deaerator chamber in accordance with the level of the liquid in the bottom of said chamber to maintain said level sufficiently high to prevent drawing off of air and foam from said chamber.

9. An apparatus for deaerating a liquid food and preventing contact of air therewith during packaging, said apparatus including a supply reservoir for said liquid, a deaerator chamber, means for continuously delivering liquid from said reservoir to said chamber and including an intake pipe, means for continuously maintaining said chamber at a vacuum high enough to effect boiling of the water in said liquid at the temperature at which said liquid is introduced into said chamber to remove substantially all of the oxygen from said liquid, a surge tank having a float extending substantially across the full cross-section of said tank and resting on the surface of the liquid in said tank to prevent reaeration of the liquid therein, a container-filling mechanism including a filling reservoir, a pump connected to the liquid outlet side of said deaerator chamber for continuously drawing the liquid from the bottom of said chamber and delivering it to said surge tank below said float under super-atmospheric pressure, means for delivering liquid from said surge tank to said filling reservoir under super-atmospheric pressure to prevent reaeration of said liquid, and means for controlling the flow of liquid through said intake pipe into said deaerator chamber in accordance with the level of the liquid in the bottom of said chamber to maintain said level sufficiently high to prevent drawing off of air and foam from said chamber.

10. A system for processing milk to deaerate it and prevent contact of the deaerated milk with air during packaging, including, a supply reservoir for said milk, a deaerator chamber for deaerating the milk to retard the destruction of the ascorbic acid and the development of the oxidized flavor therein, means for continuously delivering the milk from said reservoir to the upper part of said chamber, and including an intake spray pipe, a preheater for preheating the milk prior to its delivery into said chamber, means for continuously maintaining said chamber at a vacuum high enough to effect flash boiling of the water in said milk at the temperature at which said milk is introduced into said chamber to remove substantially all of the oxygen from said milk, a pasteurizer, a cooler, a surge tank, a container-filling mechanism including a filling reservoir, a pump connected to the outlet side of said deaerator chamber for continuously drawing the milk from the bottom of said chamber and delivering it successively under super-atmospheric pressure through said pasteurizer, through said preheater in heat exchange relationship with the milk being delivered towards said deaerator chamber, through said cooler and to said surge tank, means for substantially completely preventing air from coming in contact with the milk in said surge tank, means for delivering the milk from said surge tank to the inlet of said filling reservoir under super-atmospheric pressure, and means for controlling the flow of milk through said intake pipe and into said chamber in accordance with the level of the milk in the bottom of said chamber to maintain said level sufficiently high to prevent drawing off of air and foam from said chamber.

11. A continuous process for treating milk to retard the destruction of ascorbic acid and the development of oxidized flavors therein while preventing reaeration thereof, which comprises preheating a stream of the milk, continuously delivering the preheated milk as a relatively finely divided spray into the upper part of a deaerator chamber, maintaining in said chamber a vacuum high enough to effect the boiling off of water from said milk at the prevailing temperature at which said milk is introduced into said deaerator chamber and to effect substantially complete removal of all air from the milk in said chamber, withdrawing water vapors and air from said chamber as fast as they are liberated from the milk, simultaneously pumping the deaerated milk from the bottom of said chamber to filling mechanism, maintaining a substantial depth of liquid and a substantially constant liquid level in said chamber to prevent withdrawal of air or foam, and maintaining the milk under superatmospheric pressure during delivery to the filling mechanism.

12. A continuous process for treating a food liquid while preventing reaeration thereof, which comprises preheating the liquid, continuously delivering the preheated liquid as a relatively finely divided spray into a deaerator chamber, maintaining said chamber under a vacuum high enough to effect the boiling of water in said liquid at the temperature at which said liquid is delivered into said chamber to thereby remove substantially all of the oxygen from said liquid, simultaneously delivering the deaerated liquid from said deaerator chamber to a surge tank, maintaining the liquid level in said chamber sufficiently high to prevent drawing off of air or foam from said chamber, maintaining said surge tank under superatmospheric pressure, and delivering the liquid from said surge tank to containers.

13. A continuous process of treating milk to retard the destruction of ascorbic acid and the development of oxidized flavors therein while preventing reaeration thereof, which comprises preheating the milk, continuously delivering the preheated milk as a relatively finely divided spray into the upper part of a deaerator chamber, maintaining in said chamber a vacuum high enough to effect the boiling off of water from said milk at the prevailing temperature at which said milk is introduced into said deaerator chamber and to effect substantially complete removal of all air from the milk in said chamber, withdrawing water vapors and air from said chamber as fast as they are liberated from the milk, simultaneously withdrawing the deaerated milk from the bottom of said chamber while maintaining a substantial depth of liquid and a substantially constant liquid level in said chamber so as to prevent withdrawal of air and foam, promptly subjecting the withdrawn deaerated milk to superatmospheric pressure in a closed system, pasteurizing the milk while maintaining it under superatmospheric pressure and delivering the pasteurized milk under superatmospheric pressure to a filling mechanism.

PAUL F. SHARP.
DAVID B. HAND.
EDWARD S. GUTHRIE.

REFERENCES CITED

The following references are of record in the file of this patent:

UNITED STATES PATENTS

| Number | Name | Date |
|---|---|---|
| 1,618,789 | Todd | Feb. 22, 1927 |
| 1,570,646 | Rogers | Jan. 26, 1926 |
| 1,693,034 | Jensen | Nov. 27, 1928 |
| 602,315 | Fernandez | Apr. 12, 1898 |
| 151,920 | Schmitz | June 9, 1874 |
| 160,472 | Schmitz | Mar. 2, 1875 |

FOREIGN PATENTS

| Number | Country | Date |
|---|---|---|
| 237,899 | Great Britain | Oct. 22, 1926 |